(12) United States Patent
Takayanagi et al.

(10) Patent No.: US 6,616,316 B2
(45) Date of Patent: Sep. 9, 2003

(54) SPREAD ILLUMINATING APPARATUS WITH FRAME

(75) Inventors: Kazutoshi Takayanagi, Iwata-gun (JP); Motoji Egawa, Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/206,338

(22) Filed: Jul. 29, 2002

(65) Prior Publication Data

US 2003/0026109 A1 Feb. 6, 2003

(30) Foreign Application Priority Data

Aug. 3, 2001 (JP) ........................................ 2001-236243

(51) Int. Cl.$^7$ ................................................ F21V 8/00
(52) U.S. Cl. ............................................ 362/561; 362/31
(58) Field of Search ............................ 362/31, 561, 555

(56) References Cited

U.S. PATENT DOCUMENTS 5,299,038 A * 3/1994 Hamada et al. ............... 362/31
5,654,779 A * 8/1997 Nakayama et al. ........... 362/31
5,666,172 A * 9/1997 Ida et al. ....................... 362/31
6,540,368 B2 * 4/2003 Akaoka ........................ 362/31

* cited by examiner

Primary Examiner—Laura K. Tso
(74) Attorney, Agent, or Firm—Oliff & Berridge, PLC

(57) ABSTRACT

A spread illuminating apparatus combined with a liquid crystal display via a frame has a reduced thickness as a whole, thereby realizing a natural liquid crystal display image. A light conductive plate has its peripheral portion fitted in a groove of the frame, and a lamp disposed on a side surface of the light conductive plate is housed in the frame. A top side portion of the liquid crystal display is fitted into a cut-away portion of the frame by a predetermined dimension, and a space between a bottom surface of the light conductive plate and a top surface of the liquid crystal display is reduced, whereby the thickness of the entire apparatus is reduced by a dimension of the liquid crystal display fitted into the frame compared with that of the conventional configuration in which the frame is superimposed on the top surface of the liquid crystal display.

2 Claims, 4 Drawing Sheets

SPREAD ILLUMINATING APPARATUS WITH FRAME

BACKGROUND OF THE INVENTION

1. Field of the Invention

The present invention relates to a spread illuminating apparatus used as an illuminating means for a liquid crystal display, and more particularly to a frame of such a spread illuminating apparatus.

2. Description of the Related Art

A liquid crystal display (hereinafter referred to as "LCD") featuring low profile, small occupied volume and light-weight has been extensively used in various electric products such as cellular phones and personal computers, and the demand therefor has been increasing. Since a liquid crystal used for the LCD does not emit light by itself, the LCD requires a separate illuminating means when used in dark places where sunlight or room light is not satisfactorily available. The illuminating means is demanded to be small in size and low in power consumption, and recently a spread illuminating apparatus of side light type (light conductive plate type) is often used as the illuminating means.

FIG. 5 shows an exploded perspective view showing an embodiment of a conventional spread illuminating apparatus of side light type having a frame (housing).

As shown in the figure, a spread illuminating apparatus 1' generally comprises a light conductive plate 2 made of a light-transmissible material, lamps 5a and 5b comprising respective light conductive bars 3a and 3b and respective spot-like light sources 4a and 4b and disposed respectively along side surfaces 8 and 18 of the light conductive plate 2, an FPC (flexible printed circuit) 6 having the light sources 4a and 4b mounted thereon, light reflection members (reflectors) 13a and 13b covering the lamps 5a and 5b, respectively, and frames 7a and 7b covering the peripheral portion of the spread illuminating apparatus 1' comprising the above-mentioned members. Lights emitted from the lamps 5a and 5b enter the light conductive plate 2 and are reflected therein so as to irradiate an LCD L disposed under the light conductive plate 2.

A light reflection pattern 29 is formed on a top surface (observation surface) 25 of the light conductive plate 2 so that the lights having entered the side surfaces 8 and 18 (hereinafter referred to also as "incidence surfaces") are reflected therein and emitted through a bottom surface 26 in a uniform spread manner in the direction of the LCD L. The light reflection pattern 29 comprises a plurality of grooves 27 and a plurality of flat portions 28 adjacent thereto, and is oriented parallel to the longitudinal direction of the light conductive bars 3a and 3b. The light reflection pattern 29 may comprise only grooves continuously formed. The grooves may be oriented so as to have a predetermined angle with respect to the longitudinal direction of the light conductive bars. With the light reflection pattern thus configured, the lights having entered the light conductive plate 2 are reflected in a substantially uniform manner at the entire top surface of the light conductive plate 2, and irradiates the LCD L disposed under the light conductive plate 2.

The lamps 5a and 5b comprise the respective light conductive bars 3a and 3b and the respective light sources (for example, light emitting diodes) 4a and 4b. Optical path conversion means 12a and 12b are formed on respective one side surfaces of the light conductive bars 3a and 3b, and the light sources 4a and 4b are disposed close to respective one ends of the light conductive bars 3a and 3b. The light sources 4a and 4b are mounted on the FPC 6 and fixed thereto by soldering. The light reflection members 13a and 13b are disposed so as to cover respectively the light conductive bars 3a and 3b and two opposing sides of the light conductive plate 2 when the spread illuminating apparatus 1' is assembled.

The light reflection members 13a and 13b are provided in order to efficiently guide the lights emitted from the light sources 4a and 4b into the light conductive plate 2, to prevent the light conductive bars 3a and 3b from getting damaged due to a contact with other members, or to enhance a dust-proof effect for the light conductive bars 3a and 3b. The light reflection members 13a and 13b are shaped substantially like U-letter in section, and cover the longitudinal surfaces of the light conductive bars 3a and 3b except a surface facing the light conductive plate 2. The reflection members 13a and 13b are structured such that a film evaporated with a metal such as silver, or a white film is attached to a hard resin member or that a metal plate such as an aluminum plate or a stainless steel-plate is bent.

The frames 7a and 7b are each structured such that a metal plate is bent substantially like U-letter, are shaped so as to constitute respective halves of a picture frame with portions corresponding to an observation surface cut away when the spread illuminating apparatus 1' is assembled, and cover the lamps 5a and 5b and a peripheral portion of the light conductive plate 2. Thanks to the frames 7a and 7b, the components of the spread illuminating apparatus can be reliably fixed. And, since the light sources can be fixed in a predetermined position with respect to the respective light conductive bars, the lights emitted from the light sources can be efficiently guided in the light conductive bars.

However, the spread illuminating apparatus with the above-described frames has the following problems.

Since an area of the spread illuminating apparatus 1' with the frames 7a and 7b mounted thereon is substantially equal to an area of the LCD L, and also, since the spread illuminating apparatus 1' is superimposed over a top surface of the LCD L, the apparatus, as a whole, has a thickness equal to a total thickness of the LCD L, the lamp 5a or 5b (also the light reflection member 13a or 13b if attached), and the frame 7a or 7b. As a result, the total thickness is considerably increased.

Further, since lower frame portions of the frames 7a and 7b are inserted between the light conductive plate 2 and the LCD L, a wasted space is given for their thickness between the light conductive plate 2 and the LCD L.

FIGS. 6 to 8 are detailed schematic representations of the total thickness of the apparatus, and the space given between the light conductive plate 2 and the LCD L when the spread illuminating apparatus 1' is superimposed over the top surface of the LCD L.

FIG. 6 is an exploded perspective view of the entire apparatus substantially comprising the LCD L, the frame 7 disposed on the top surface of the LCD, and the light conductive plate 2 and the lamp 5 enclosed in the frame 7.

FIG. 7 is a cross-sectional view through the line E—E in FIG. 6, and FIG. 8 is a cross-sectional view through the line F—F in FIG. 6.

The light conductive plate 2 and the lamp 5 are disposed so as to be enclosed in the frame 7. In other words, the frame 7 covers the peripheral portion of the light conductive plate 2, and the lamp 5. Thus, the entire apparatus has a thickness equal to a total of the thickness P3 of the LCD L and the thickness P2 of the entire frame 7. A lower portion of the frame 7 is disposed between the light conductive plate 2 and the LCD L, and a space equivalent to the thickness P1 of the lower portion of the frame 7 is generated. Even when the P1 is very slight, a screen of the LCD looks retracted as viewed from above the light conductive plate 2, which gives a sense of discomfort to an observing person. In order to eliminate this trouble, the P1 of the lower portion of the frame 7 may be reduced. However, this sacrifices the strength of the frame.

SUMMARY OF THE INVENTION

The present invention has been made in the light of the above problems. It is an object of the present invention to provide a spread illuminating apparatus which can reliably fix each component while ensuring the strength, reducing the entire thickness, and realizing a natural liquid crystal image.

In order to solve the above problems, according to a first aspect of the present invention, in a spread illuminating apparatus in which a light reflection pattern is formed on a top surface of a light conductive plate made of a light-transmissible material, and a lamp comprising a light conductive bar and a spot-like light source disposed on an end of the light conductive bar is disposed along and close to at least one side surface of the light conductive plate, and which is disposed over a top surface of an LCD, a top side portion of the LCD is fitted into a cut-away portion at a center of a frame covering the lamp and a peripheral portion of the light conductive plate, and a space between a bottom surface of the light conductive plate and a top surface of the LCD is set to be small.

In the configuration according to the first aspect, thanks to the frame provided, each member constituting the spread illuminating apparatus can be reliably fixed in place, in particular, the light source can be reliably fixed at a predetermined position with respect to the light conductive bar, and, as a result, light emitted from the light source can be efficiently guided into the light conductive bar. Further, since the space between the bottom surface of the transparent substrate and the top surface of the LCD is reduced by fitting the top side portion of the LCD into the cut-away portion at the center of the frame, the thickness of the entire apparatus, which is conventionally increased by the thickness of the entire frame, can be reduced. In addition, since the thickness of the entire frame need not be reduced, the strength of the frame can be ensured.

In order to solve the above problems, according to a second aspect of the present invention, in a spread illuminating apparatus, in which a light reflection pattern is formed on a top surface of a light conductive plate made of a light-transmissible material, and a lamp comprising a light conductive bar and a spot-like light source disposed on an end of the light conductive bar is disposed along and close to at least one side surface of the light conductive plate, and which is disposed over a top surface of an LCD, a top side portion of the LCD is fitted into a cut away portion at a center of a frame covering the lamp and a peripheral portion of the light conductive plate, and a bottom surface of the light conductive plate is in contact with a top surface of the LCD.

In the configuration according to the second aspect, the top side of the LCD is fitted into the cut-away portion at the center of the frame so that the top surface of the LCD gets into contact with the bottom surface of the light conductive plate, whereby the thickness of the entire apparatus is reduced.

DESCRIPTION OF THE PREFERRED EMBODIMENTS

Figure 1:
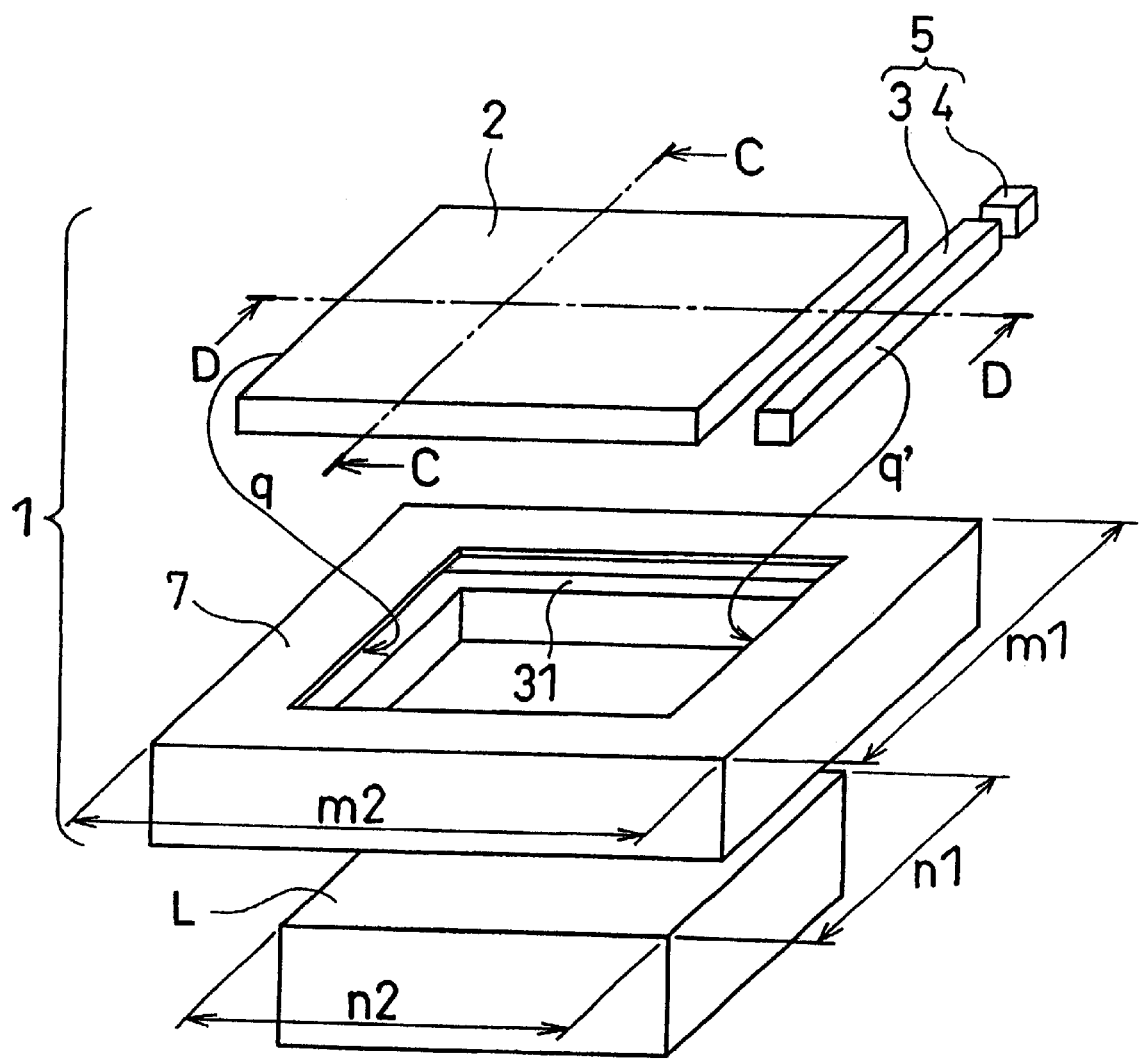
FIG. 1 is an exploded perspective view showing an embodiment of a spread illuminating apparatus in accordance with the present invention.

Preferred embodiments of the spread illuminating apparatus according to the present invention will hereinafter be explained referring to the FIGS. 1 to 4. The spread illuminating apparatus of the present invention has improvement in the structure of the frame of a conventional spread illuminating apparatus, and the components identical with or corresponding to those in the conventional spread illuminating apparatus are represented by the same reference numerals and the detailed description thereof is omitted.

An embodiment of the spread illuminating apparatus of the present invention will be described with reference to FIG. 1. A spread illuminating apparatus 1 substantially comprises a light conductive plate 2, a lamp 5 comprising a light conductive bar 3 and a spot-like light source 4 and disposed along a side surface of the light conductive plate 2, and a frame 7 covering the light conductive plate 2 and the lamp 5. A liquid crystal display (not shown and hereinafter referred to as "LCD") L is disposed under the spread illuminating apparatus 1.

A light reflection pattern is formed on a surface of the light conductive plate 2 so that light from the lamp 5 is efficiently and uniformly reflected in the direction of the LCD L. An optical path conversion means to efficiently and uniformly reflect light from the light source 4 in the direction of the light conductive plate 2 is formed on a side surface of the light conductive bar 3.

A light reflection member (reflector) may be disposed around the lamp 5 so that the light from the light source 4 is efficiently reflected in the direction of the light conductive plate 2. Further, a polarizer may be mounted on a top surface of the LCD L disposed under the spread illuminating apparatus 1.

The frame 7 comprises two substantially U-shaped members combined with each other, thereby forming a picture frame, in which a center portion is cut away so that a screen of the LCD L can be observed when viewed from above the light conductive plate 2 (hereinafter referred to as "observation surface").

A peripheral portion of the light conductive plate 2 and the lamp 5 are disposed within the frame 7 (at positions indicated by arrows q and q'). More specifically, a groove 31 is formed at an inner periphery of each of the substantially U-shaped members constituting the frame 7, the peripheral portion of the light conductive plate 2 and the lamp 5 are inserted in the groove 31, and the two U-shaped members are put together by adhesion or the like. As a result, the peripheral portion of the light conductive plate 2 is reliably fitted in the groove 31, and the lamp 5 is reliably enclosed in the groove 31.

In this connection, so long as the frame 7 can integrally hold each member constituting the spread illuminating apparatus, and the screen of the LCD can be observed, the configuration of the frame 7 is not limited to the present embodiment. In addition, the frame 7 may be of a metal or a resin.

A frame of another embodiment may be, for example, a frame-like resin-molded member, which has a frame-like seat to position the light conductive plate, which has, one side thereof, a recess to position the light source and a flat seat to position the light conductive bar, and in which the light source, the light conductive bar and the light conductive plate are held fixedly in a predetermined positional relation with regard to one another when attached to respective positioning means.

The LCD L is fitted into the cut-away portion in the center of the frame 7, and has its bottom surface supported by a frame of an appliance into which the LCD is incorporated as described below. The top surface of the LCD L and the bottom surface of the light conductive plate 2 are either separated from each other by a small space, or brought into contact with each other, and the side surface of the LCD L and the side surface of the cut-away portion of the frame 7 are either separated from each other by a small space, or brought into contact with each other. In this configuration, the thickness of the entire apparatus can be smaller than conventionally.

In order to fit the LCD L into the cut-away portion of the frame 7, each widths, which satisfy the relations of m1≈n1 and m2≈n2 in the conventional configuration, have to be modified so as to satisfy the relations of n1<m1 and n2<m2, where m1 and m2 are entire longitudinal and transverse widths of the frame 7, respectively, and n1 and n2 are longitudinal and transverse widths of the LCD L, respectively.

In the figure, it may look like the LCD L has a constant width in the thickness direction, but actually it has a larger width at its bottom side than at its top side. The widths n1 and n2 at the upper side are dimensioned so that the LCD fits into the cut-away portion of the frame 7.

Figure 2:
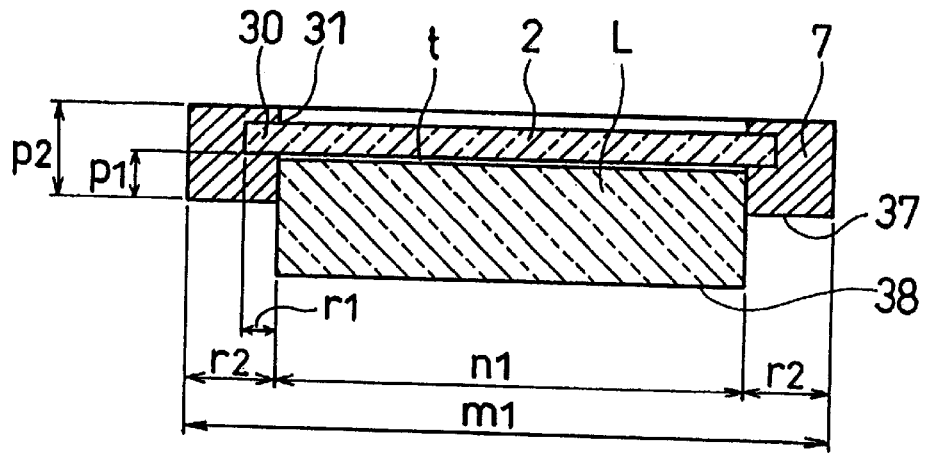
FIG. 2 is a cross-sectional view through the line C—C in FIG. 1.

Referring to FIG. 2, a peripheral portion 30 of the light conductive plate 2 is fitted in the groove 31 of the frame 7. A depth r1 of the groove 31 is dimensioned such that the light conductive plate 2 does not drop off the frame 7 (groove 31), and thereby the light conductive plate can be reliably fixed by the frame 7.

In this connection, the light conductive plate 2 do not have to be fixed to the frame 7 by means of fitting, but may alternatively be fixed, for example, by a double-sided tape to a frame-like seat provided on the frame 7.

A thickness p2 and a width r2 of an edge portion of the frame 7 have respective predetermined dimensions in order to protect the light conductive plate 2 or to ensure a sufficient strength of the frame. Also, a thickness p1 corresponding to part of the thickness p2 located below the light conductive plate 2 has a predetermined dimension or more in order to ensure a sufficient strength.

The entire longitudinal width m1 of the frame 7 is dimensioned so as to satisfy the relation of n1<(m1−2r2), and the top side portion of the LCD L is fitted into the cut-away portion of the frame 7 by the thickness p1. More specifically, a space t between the top surface of the LCD L and the bottom surface of the light conductive plate 2 is preferably set to be 200 μm or less. This makes the thickness of the entire apparatus substantially equal to a combined thickness of the LCD L and the light conductive plate 2, which reduces the entire thickness substantially by the thickness p1 compared with the thickness of the conventional configuration in which the frame 7 is superimposed over the top surface of the LCD L.

Figure 3:
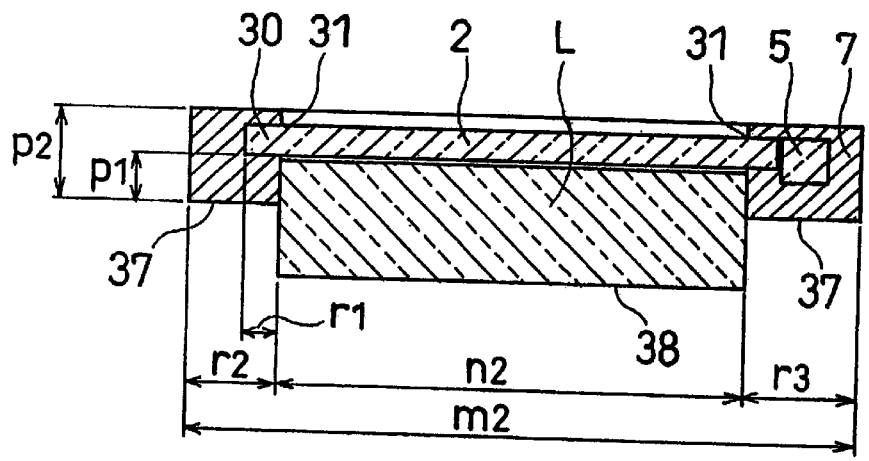
FIG. 3 is a cross-sectional view through the line D—D in FIG. 1.

Referring to FIG. 3, the peripheral portion 30 of the light conductive plate 2 is fitted in the groove 31 of the frame 7, and the lamp 5 (comprising the light conductive bar 3, the light source 4, and the light reflection member and the FPC (not shown)) disposed on a side surface of the light conductive plate 2 is housed in the frame 7. As a result, the lamp 5 can be reliably fixed in a predetermine position with regard to the light conductive plate 2. In this configuration, the entire transverse width m2 of the frame 7 is dimensioned so as to satisfy the relation of n2<(m2−r2−r3). As a result, the top side portion of the LCD L is fitted into the cut-away portion of the frame 7 substantially by the thickness p1 in the same positional relation as shown in FIG. 2.

In this connection, in FIGS. 2 and 3, a bottom surface 37 of the frame 7 and a bottom surface 38 of the LCD L are held by a frame of an appliance (for example, a cellular phone and an automatic cash dispenser) in which the entire apparatus (including the spread illuminating apparatus 1 and the LCD L) is incorporated, and therefore the size of the space between the bottom surface of the light conductive plate 2 and the top surface of the LCD L is determined by the structure and size of the appliance.

Figure 4:
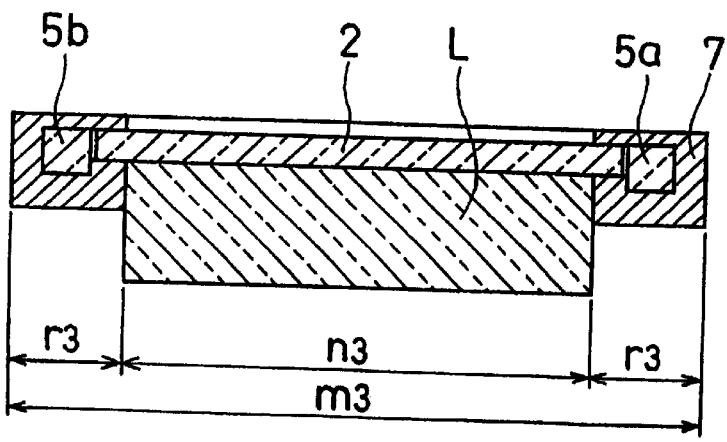
FIG. 4 is a cross-sectional view showing another embodiment of the spread illuminating apparatus of the present invention.
Figure 5:
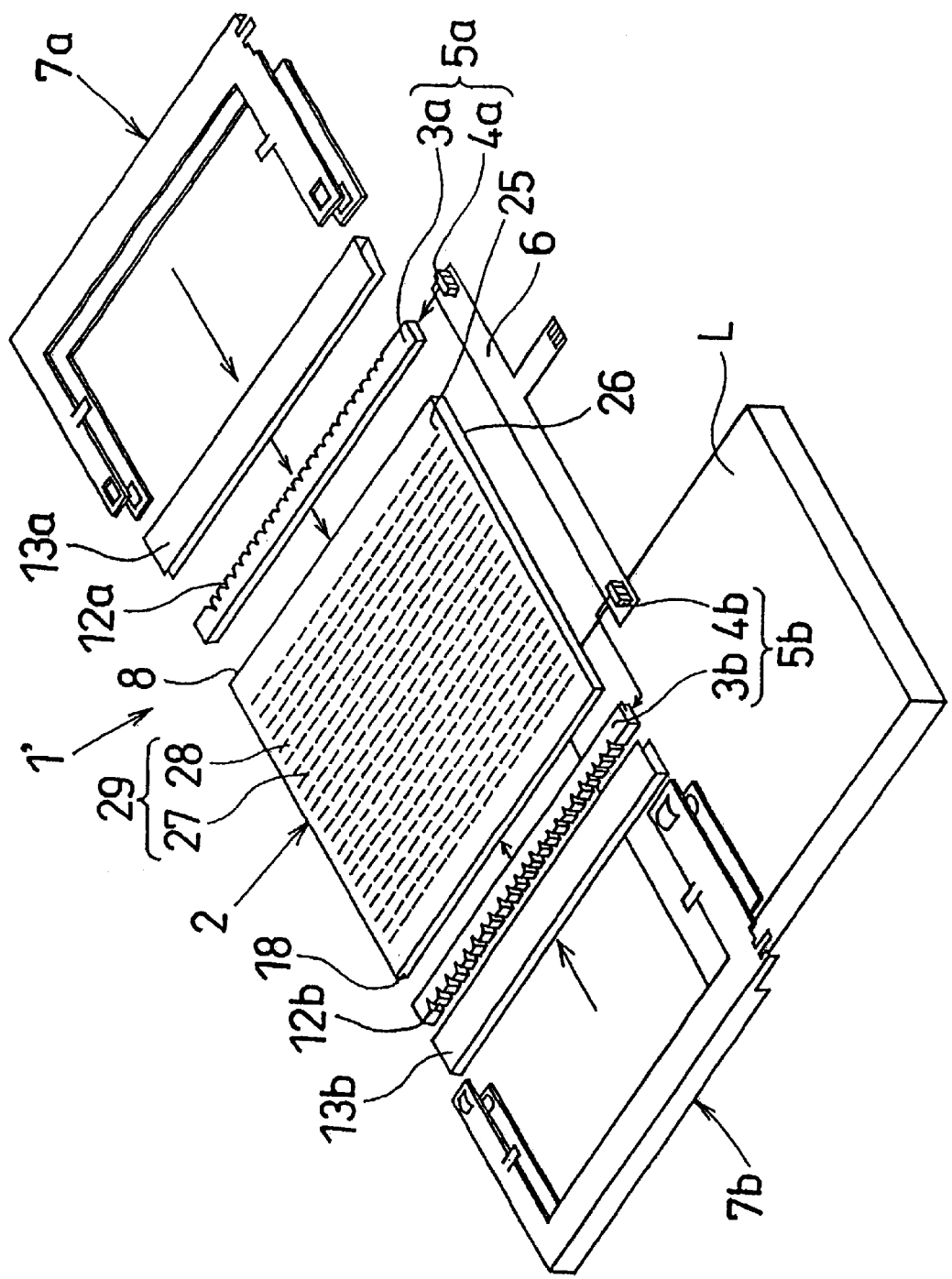
FIG. 5 is an exploded perspective view showing an embodiment of a conventional spread illuminating apparatus.
Figure 6:
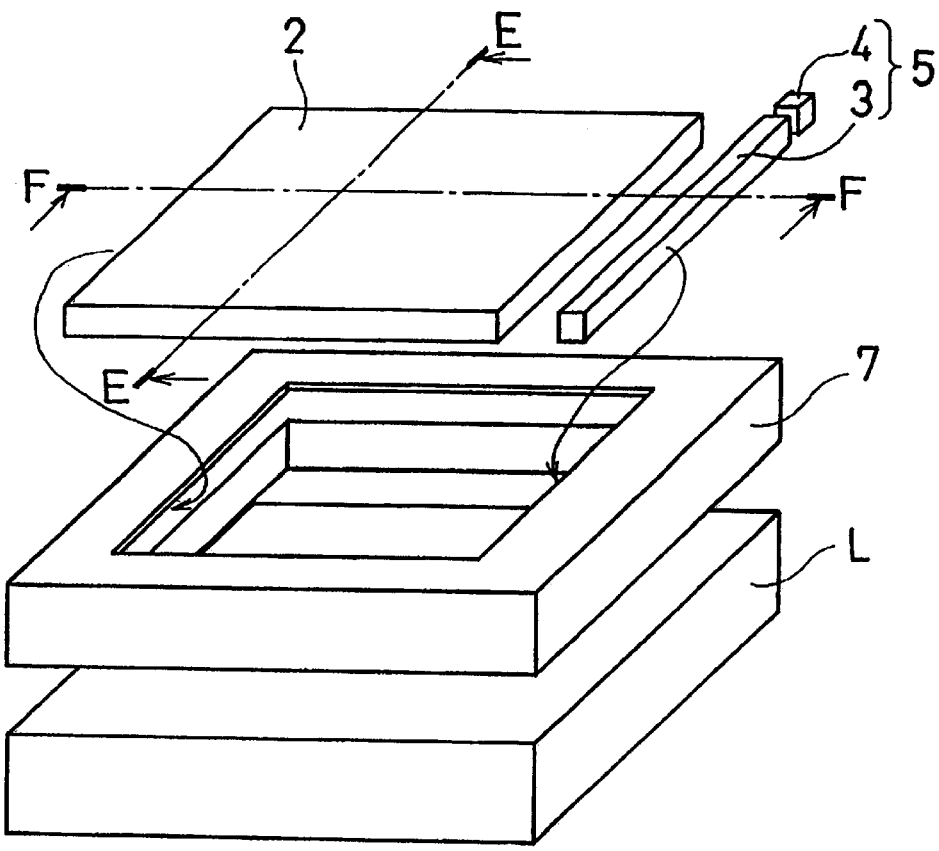
FIG. 6 is an exploded perspective view showing another embodiment of the conventional spread illuminating apparatus.
Figure 7:
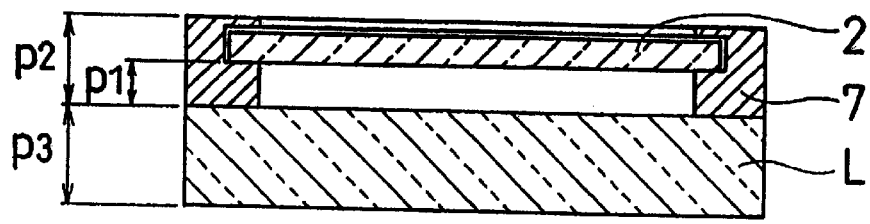
FIG. 7 is a cross-sectional view through the line E—E in FIG. 6.
Figure 8:
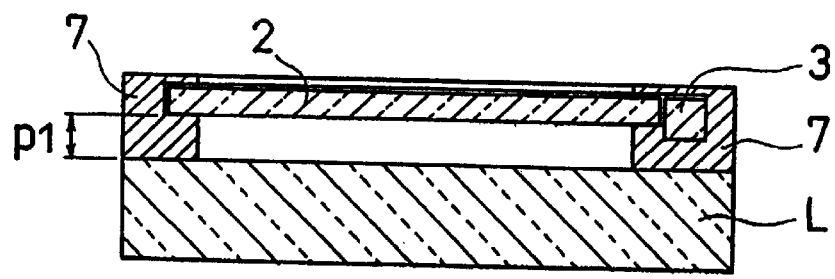
FIG. 8 is a cross-sectional view through the line F—F in FIG. 6.

Another embodiment of the spread illuminating apparatus of the present invention will be described with reference to FIG. 4. The light conductive plate 2 has lamps 5a and 5b disposed on its respective side surfaces, and have its peripheral portion fitted in the groove of the frame, with the lamps 5a and 5b housed in the frame 7. In this configuration, an entire width m3 of the frame 7 is dimensioned so as to satisfy relation of n3<(m3−2r3). As a result, in the same way as shown in FIGS. 2 and 3, the top side portion of the LCD L is fitted into the cut-away portion of the frame 7, whereby the thickness of the entire apparatus is made smaller than the thickness of the conventional configuration in which the frame 7 is superimposed over the top surface of the LCD L. Further, even if the thickness and the width of the frame 7 are increased due to use of a large spot-like light source in order to increase the light quantity of a lamp and the brightness of a screen, the thickness of the entire apparatus is not affected and is substantially equal to the combined thickness of the light conductive plate 2 and the LCD L.

The spread illuminating apparatus of the present invention has, in addition to the aforementioned advantages; the frame strength ensured, each component reliably fixed, and the thickness of the entire apparatus including the LCD reduced, the following advantages.

The image, which conventionally looked retracted and unnatural due to the space between the bottom surface of the light conductive plate and the top surface of the LCD, can now be displayed clearly and naturally. And, since the LCD is fitted into the cut-away portion of the frame, the LCD has no longer an invalid screen area at its peripheral portion.

What is claimed is:

1. A spread illuminating apparatus comprising:

a light conductive plate made of a light-transmissible material, having a light reflection pattern on its top surface, and positioned over a liquid crystal display;

a lamp comprising a light conductive bar and a spot-like light source disposed on an end of the light conductive bar, and disposed along and close to at least one side surface of the light conductive plate; and a frame covering the lamp and a peripheral portion of the light conductive plate, the frame having a top side portion of the liquid crystal display fitted into a cut-away portion at a center thereof such that a space between a top surface of the liquid crystal display and a bottom surface of the light conductive plate is reduced.

2. A spread illuminating apparatus comprising:

a light conductive plate made of a light-transmissible material, having a light reflection pattern on its top surface, and positioned over a liquid crystal display;

a lamp comprising a light conductive bar and a spot-like light source disposed on an end of the light conductive bar, and disposed along and close to at least one side surface of the light conductive plate; and a frame covering the lamp and a peripheral portion of the light conductive plate, the frame having a top side portion of the liquid crystal display fitted into a cut-away portion at a center thereof such that a top surface of the liquid crystal display is in contact with a bottom surface of the light conductive plate.

* * * * *